(12) United States Patent
Smith

(10) Patent No.: US 6,365,049 B1
(45) Date of Patent: Apr. 2, 2002

(54) SEPARATION OF PLATINUM GROUP METALS

(75) Inventor: Christopher Stanley Smith, High Wycombe (GB)

(73) Assignee: Anglo American Platinum Corporation Limited, Johannesburg (ZA)

( * ) Notice: Subject to any disclaimer, the term of this patent is extended or adjusted under 35 U.S.C. 154(b) by 0 days.

(21) Appl. No.: 09/627,054

(22) Filed: Jul. 27, 2000

(30) Foreign Application Priority Data

Aug. 5, 1999 (GB) .............................. 9918437

(51) Int. Cl.[7] .......................... C22B 11/00; B01D 15/08
(52) U.S. Cl. .......................... 210/635; 210/656; 423/22
(58) Field of Search ................................. 210/635, 656, 210/659, 198.2; 423/22

(56) References Cited

U.S. PATENT DOCUMENTS

| | | | |
|---|---|---|---|
| 3,999,983 A | 12/1976 | Grosbois et al. ............. 423/22 |
| 4,855,143 A | 8/1989 | Lowey ....................... 424/468 |
| 4,885,143 A | * 12/1989 | Schmucher ................. 210/656 |
| 5,292,490 A | * 3/1994 | Duyvesteyn ................. 423/22 |
| 5,879,644 A | * 3/1999 | Grant ......................... 210/635 |

FOREIGN PATENT DOCUMENTS

| | | | |
|---|---|---|---|
| EP | 0 756 013 | 1/1997 | ................. 210/656 |
| EP | 0 906 962 | 4/1999 | ................. 210/656 |
| GB | 1 533 373 | 11/1978 | ................. 210/656 |

* cited by examiner

Primary Examiner—Ernest G. Therkorn
(74) Attorney, Agent, or Firm—Ratner & Prestia

(57) ABSTRACT

Methods and apparatus for the interseparation of platinum group metals (PGMs) are disclosed, in particular it relates to methods and apparatus for the interseparation of one or more of iridium, rhodium and platinum from their chlorocomplexes using gel chromatography and the control of the oxidation state of the PGMs.

9 Claims, 2 Drawing Sheets

SEPARATION OF PLATINUM GROUP METALS

The present invention relates to methods and apparatus for the interseparation of platinum group metals, in particular it relates to methods and apparatus for the interseparation of platinum, rhodium and iridium.

Previously, it has been proposed to use gel chromatography to separate platinum group metals from one another on an industrial scale. Prior proposals include U.S. Pat. No. 4,855,143 (Schmuckler) and EP 756013 (Matthey Rustenburg Refiners Pty). The Schmuckler patent describes a method in which the interseparation of platinum group metals (PGMs) from an oxidised gold-free halide solution is achieved using a chromatographic medium such as a polysaccharide gel (Sephadex) or a polyacrylamide gel (Biogel). The PGMs when dissolved in a chloride solution are absorbed onto the chromatographic column and are claimed to be selectively eluted in the order ruthenium, rhodium, palladium, platinum, iridium and caesium, although it is clear from the rest of the patent that Schmuckler meant osmium. The problem with this method is that there is in fact no clear separation of PGMs.

This problem was to a large extent overcome by European patent application EP 0906,962 which describes a method for the interseparation of PGMs from a PGM-containing halide solution comprising the steps of passing the solution through a glycol methacrylate chromatographic medium, absorbing the PGMs onto the medium, eluting each PGM using an acid solution to obtain each fraction containing at least one PGM. During the elution of a reduced, mixed rhodium, iridium, ruthenium, palladium, platinum and osmium/6 molar hydrochloric acid (6 M HCl) solution through Toyopearl HW-40C using a (usually 6 M) hydrochloric acid eluent, the first eluted band contains rhodium ($[RhCl_6]^{3-}$), iridium ($[IrCl_6]^{3-}$) and ruthenium ($[RuCl_6]^{3-}$), that is, the method does not separate rhodium, iridium and ruthenium either from each other or any combinations/permutations within.

GB 1,533,373 (National Institute for Metallurgy) discloses the use of an ion-exchange column to separate Ir from other PGMs. However, it is clear that although Ir (IV) is oxidised to Ir (III) in the method, it teaches that it is necessary to form a mixed sulphito-chloro complex of Ir (III). In contrast, the present invention does not use either an ion exchange column or such sulphito-chloro complexes.

The present invention sets out to solve the problem of the separation of the insoluble metals rhodium, iridium and ruthenium from one another and platinum in addition to other PGMs using gel chromatography. This may be of particular importance during refining, by allowing the separation of these metals by chromatography on an industrial scale. Presently, traditional methods of refining involve the processes of solvent extraction, distillation and ion exchange. During the extraction process the metals are processed sequentially generally in the order gold, palladium, platinum, ruthenium and osmium, iridium and rhodium. The method of the present invention has several advantages over the previously described methods in allowing simultaneous separation of these metals. In addition, the process is extremely fast, and the purity and yield of the extracted metals is high.

Thus, in a first aspect the present invention provides a method for the interseparation of iridium in admixture with one or more other PGMs from an acidic solution containing the chloro complexes of these metals by passing said solution through at least one chromatography column containing a solid absorbant and eluting one or more fractions containing one or more PGMs, which comprises the steps of:
(a) ensuring that iridum is present on the column in a tetravalent oxidation state, and
(b) reducing the iridum from a tetravalent oxidation state to a trivalent oxidation state on the column, effecting the elution of iridium chlorocomplex separately from chlorocomplexes of other PGMs.

In a second aspect, the present invention provides a method for the interseparation of iridium in admixture with one or other PGM from an acidic solution containing chlorocomplexes of these metals by passing said solution through two or more chromatography columns containing a solid absorbant, wherein the columns are attached to one another by a control means, and eluting one or more fraction containing one or more PGMs, which comprises the steps of:
(a) ensuring that iridium is present on at least one column in a tetravalent oxidation state, and
(b) reducing the iridium on at least one column from a tetravalent oxidation state to a trivalent oxidation state, and improving the separation of iridium from chlorocomplexes of other PGMs by reverse elution.

In a preferred embodiment of these two aspects of the invention, an oxidisng eluent may be used to ensure that iridium is present on the column in a tetravalent oxidation state. Preferably the oxidising eluent is 1MHCl/5 gl$^{-1}$NaClO$_3$. Other oxidising eluents may include hydrogen peroxide. Furthermore, a reducing eluent may be used to effect the reduction of iridium from a tetravalent oxidation state to a trivalent oxidation state. Preferably the reducing eluent is 1MHCl/ascorbic acid. The concentration of ascorbic acid may be anywhere between 2 and 15 gl$^{-1}$. Other suitable reducing eluents may include TiCl$_3$.

The chromatographic medium is preferably a co-polymer of ethylene glycol and methacrylic acid, for example a medium from the Macro-Prep (trademark of Bio-Rad Laboratories) range of chromatographic media. Or a co-polymer of oligoethyleneglycol, glycidylmethacrylate pentaerythrol-dimethacrylate (for example a medium from the Toyopearl (trademark of TosoHaas and previously known as Fractogel) range of chromatographic media). Most preferably the medium is from the Toyopearl range of chromatographic media. This media has advantages in the scaling up of the chromatographic process because relatively high pressure can be applied to a column containing the medium to achieve high flow rates.

The PGMs are dissolved in an acidic solution such as hydrochloric acid. The inventors have found that 6M hydrochloric acid gives beneficial results.

The interseparation process may be carried out using a chromatographic medium having beads of any particle size. However, suitably, the medium has beads of particle size of from 32 to 300 μm, and preferably of from 50 to 180 μm, most preferably from 50 to 100 μm.

The interseparation may be carried out using known chromatographic techniques. A suitable method is batch column chromatography whereby an aliquot of feed is loaded onto the column and eluted. A valve arrangement is employed such that the output can be switched so that various products are collected in separate fractions. Alternatively, two columns may be used which are attached to one another by a control means such that the direction of eluent flow may be reversed. This permits the reverse elution of one or more of Ir and Pt or other PGMs. Reverse elution in the context of this invention means that the direction of eluent flow and the subsequent elution of any one or more of Pt, Rh and Ir is upwards through the chromatography column and not downwards as in conventional chromatography.

With appropriate modification, if necessary, other equipment including "Gatling Gun" or Continuous Annular Chromatography may be used.

BRIEF DESCRIPTION OF THE DRAWINGS

The invention will now be described by the following examples in which.

DESCRIPTION OF THE PREFERRED EMBODIMENT

EXAMPLE 1

Figure 1:
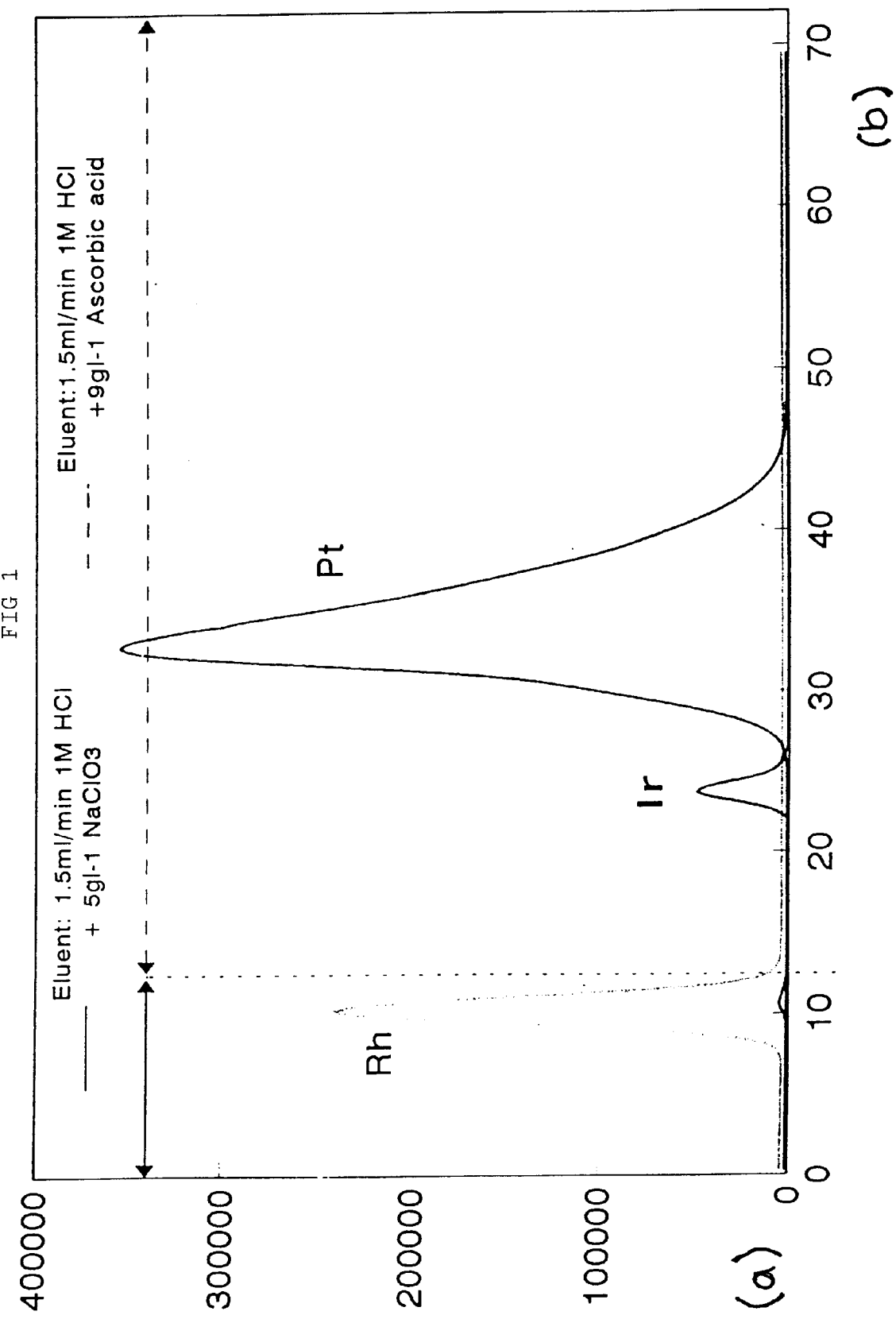
FIG. 1: Shows the separation of Rh from Ir and Pt by changing the eluent during the elution from oxidising to reducing. Scale (a) shows the intensity (mV). Scale (b) shows the retention time (mins).

A 6 M HCl feed is prepared containing 100 gl-1 Pt (IV) as $[PtCl_6]^{2-}$, 8 gl$^{-1}$ Rh(III) as $[RhCl_6]^{3-}$, 2.5 gl-1 Ir(IV) as $[IrCl_6]^{2-}$ by dissolving the appropriate amount of the $H_2[PtCl_6]$, $RhCl_3$ and $H_2[IrCl_6]$ salts respectively, in the appropriate volume of 6 M HCl. The resulting solution is stirred to ensure complete dissolution. Oxidising and reducing eluents of 1 M HCl/5 gl-1 $NaClO_3$ and 1 M HCl/9 gl-1 ascorbic acid respectively, are prepared. A glass Chromatography column is packed with a 30×1 cm bed depth of Toyopearl HW-40C in 6M HCl and then flushed thoroughly with 1 M HCl to remove all traces of the 6 M HCl used during the packing process. After flushing with 1 M HCl, the column is then flushed thoroughly with 1 M HCl/5 gl-1 $NaClO_3$ to ensure an oxidising environment prior to admission of the sample. The flushed column is connected directly to an ICP emission spectrometer and a 0.15 ml sample of the Rh/Ir/Ru/6 M HCl feed loaded onto the top of the column via an injection valve. The sample is eluted with a 1 M HCl/5 gl$^{-1}$ NaCl $O_3$ eluent (oxidising) at a flowrate of approximately 1.5 ml per minute, until the rhodium ($[RhCl_6]^{3-}$) has eluted. At this stage, the eluent is changed to the reducing 1 M HCl/9 gl-1 ascorbic acid eluent and the elution continued until the iridium ($[IrCl_6]^{2-}$[$IrCl_6]^{3-}$) and platinum ($[PtCl_6]^{2-}$) have eluted in that order. During this reducing elution, the intense brown iridium (IV) on the column visibly fades and disappears (iridium (III) is a low intensity olive green colour and is not seen at the low concentrations present on the column). The profile shown in FIG. 1 is achieved.

EXAMPLE 2

Figure 2:
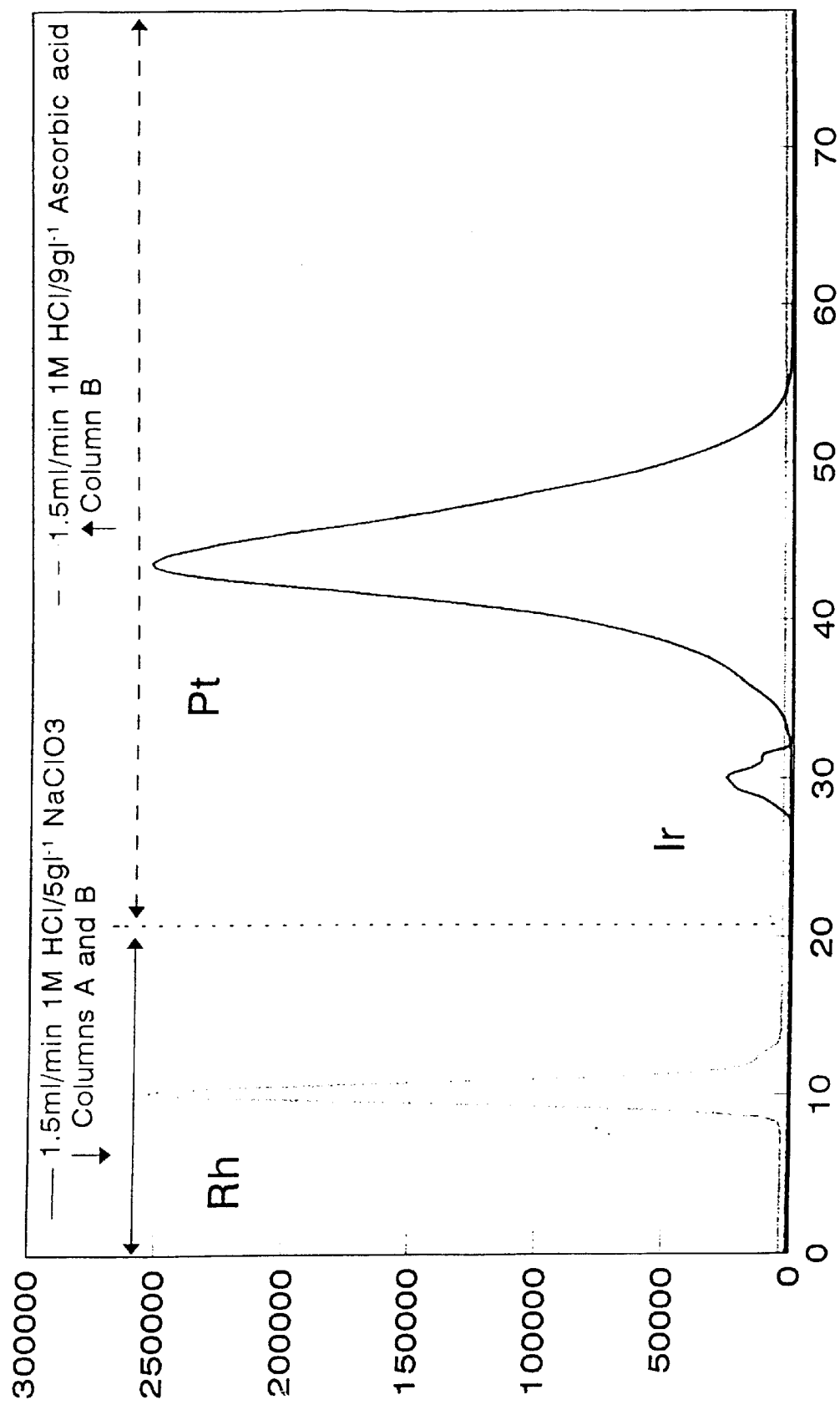
FIG. 2: Shows the separation of Rh/Ir/Pt using forward/reverse elution, oxidising/reducing eluents and a two column system. Column A: 6.6×1 cm HW 40C. Column B : 20×1 cm HW 40C. Scale (a) shows the intensity (mV). Scale (b) shows the retention time (mins). Upward arrow denotes upward elution. Downward arrow denotes downward elution.

It is possible to split the single 30 cm column into two columns and use both downwards and upwards elution (reverse elution). The single 30 cm column is split into a ca. 20 cm column and a 10 cm column connected via a short length of tubing with a three-way tap attached between the two columns. The $[RhCl_6]^{3-}/[PtCl_6]^{2-}/[IrCl_6]^{2-/6}$ M HCl feed is loaded as previously described and $[RhCl_6]^{3-}$ eluted downwards through both columns using the oxidising 1 M HCl/5 gl$^{-1}$ $NaClO_3$ eluent. When the $[RhCl^6]_3$- has eluted, the eluent is changed from oxidising (1 M HCl/$NaClO_3$) to reducing (1 M HCl/ascorbic acid) and also, the eluent inlet point changed from the top of the column to the tap between the two columns. Furthermore, this tap is positioned so that the direction of eluent flow is upwards rather than downwards. In doing this, the $[IrCl_6]^{2-}$is still reduced to $[IrCl_6]^{3-}$on the column but the gap between the latter and the $[PtCl_6]^{2-}$extended as the $[IrCl_6]^3$ does not now, have to overtake the $[PtCl_6]^{2-}$. The $[IrCl_6]^{3-}$and $[PtCl_6]^{2-}$are eluted out the top of the column. The potential advantage of this reverse elution technique is that the resolution between the iridium and platinum can be increased. The separation profile obtained from this experiment is shown in FIG. 2.

It will be appreciated that many variations can be made to the invention herein described without departing from the present inventive concept.

What is claimed is:

1. A method for the interseparation of iridium in an admixture of platinum group metals (PGMs) comprising iridium and one or more other PGMs from an acidic solution containing chlorocomplexes of said PGMs by passing said solution through two or more chromatography columns containing a solid absorbant, wherein the columns are attached to one another by a control means, and eluting one or more fractions containing one or more of said PGMs, which comprises the steps of (a) ensuring that iridium is present on at least one column in a tetravalent oxidation state, and (b) reducing the iridium on at least one column from a tetravalent oxidation state to a trivalent oxidation state, and separating an iridium (III) chlorocomplex from chlorocomplexes of other PGMs by reverse elution.

2. A method as claimed in claim 1 wherein the step of reducing the iridium is effected by passing a reducing eluent through one column only and any one or more of Pt, Rh and Ir are eluted by reverse elution.

3. A method as claimed in claim 1, wherein the presence of iridium on at least one column in a tetravalent state is achieved by the use of an oxidising eluent.

4. A method as claimed in claim 3 wherein the oxidizing eluent is 1 MHCL/5 gl-1$NaClO_3$.

5. A method as claimed in claim 1 wherein the presence of iridium on at least one column in a trivalent oxidation state is achieved by the use of a reducing eluent.

6. A method as claimed in claim 5 wherein the reducing eluent is 1 MHCL/9 gl-1 ascorbic acid.

7. A method as claimed in claim 1 wherein the solid absorbant is any one of the following:

a co-polymer of ethylene glycol and methacrylic acid, or a co-polymer of oligoethyleneglycol, glycidylmethacrylate pentaerythrol-dimethacrylate.

8. A method as claimed in claim 1, wherein the acidic solution comprises hydrochloric acid and said chlorocomplexes of said PGMs.

9. A method as claimed in claim 1 wherein the chromatographic medium has beads of particle size of from 32–100 μm.

* * * * *

UNITED STATES PATENT AND TRADEMARK OFFICE
CERTIFICATE OF CORRECTION

PATENT NO. : 6,365,049 B1
DATED : April 2, 2002
INVENTOR(S) : Smith

It is certified that error appears in the above-identified patent and that said Letters Patent is hereby corrected as shown below:

<u>Title page,</u>
Item [*] Notice, delete the phrase "by 0 days" and insert -- by 24 days --

Signed and Sealed this

Twenty-sixth Day of October, 2004

JON W. DUDAS
*Director of the United States Patent and Trademark Office*